United States Patent [19]

Bose

[11] 4,453,116
[45] Jun. 5, 1984

[54] SCALAR DECOUPLED CONTROL FOR AN INDUCTION MACHINE USING CURRENT CONTROL

[75] Inventor: Bimal K. Bose, Latham, N.Y.

[73] Assignee: General Electric Company, Schenectady, N.Y.

[21] Appl. No.: 539,216

[22] Filed: Oct. 5, 1983

[51] Int. Cl.³ .............................................. H02P 7/42
[52] U.S. Cl. .................................. 318/727; 318/799; 318/802; 318/809
[58] Field of Search ............................... 318/720–723, 318/798–811

[56] References Cited

U.S. PATENT DOCUMENTS

| | | | |
|---|---|---|---|
| 4,227,138 | 10/1980 | Espelage et al. | 318/811 |
| 4,230,979 | 10/1980 | Espelage et al. | 318/723 |
| 4,243,927 | 1/1981 | D'Atre | 318/810 |
| 4,258,302 | 3/1981 | Plunkett | 318/723 |
| 4,281,276 | 7/1981 | Cutler et al. | 318/810 |
| 4,314,190 | 2/1982 | Walker et al. | 318/803 |
| 4,320,331 | 3/1982 | Plunkett | 318/809 |

Primary Examiner—B. Dobeck
Assistant Examiner—Arthur G. Evans
Attorney, Agent, or Firm—William H. Steinberg; James C. Davis, Jr.; Marvin Snyder

[57] ABSTRACT

A scalar control supplemented by a decoupler transfer function control is provided to develop frequency and current commands for a current controlled inverter driving an induction machine. The machine torque is controlled by the slip and corresponding torque producing component of stator current. The rotor flux is maintained constant by the flux component of stator current. The total stator current is controlled to hold rotor flux constant with desired torque during steady state conditions and the decoupler compensator varies stator current to maintain rotor flux constant during transient conditions.

7 Claims, 6 Drawing Figures

SCALAR DECOUPLED CONTROL FOR AN INDUCTION MACHINE USING CURRENT CONTROL

This application relates to my copending application Ser. No. 406,589, filed Aug. 9, 1982 and assigned to the instant assignee

BACKGROUND OF THE INVENTION

This invention relates to a control for a solid state adjustable speed induction machine drive and more particularly to a scalar decoupled control for an induction machine supplied by a current-controlled voltage-fed inverter for achieving fast transient response.

In many applications, such as servo and rolling mill drives, the drive system is required to have fast transient response and the capability to operate at zero speed with full torque. Traditionally, for such applications, dc machines have been used. The dc machines are characterized by inherent decoupling between the armature or torque component of current and field flux, and therefore, have a fast response characteristic to changes in command torque. The ac machines, particularly the cage type induction motors, are attractive in industrial applications because of the absence of commutators and brushes and low rotor inertia. The induction machine is a complex multivariable nonlinear coupled system where each of the outputs is a function of the input variables. Because of the coupling between input and output, the conventional scalar or dc signal control with torque and flux feedback loops fails to give adequate transient response to torque command changes. If, for example, a step torque demand is established by incrementing the slip signal with the desired rated flux, the flux will diminish temporarily until compensated by a feedback loop in a sluggish manner.

The field-oriented or vector control theories have been advanced in the recent years to solve the coupling problem in ac machines. The theories are based on the synchronously rotating direct axis and quadrature axis (d-q) model of the machine in which variables appear as dc quantities in the steady-state condition. The d and q component of stator current in this model are mutually decoupled and can be controlled as a flux component and a torque component of current, respectively. To convert the d and q components of command signals from the rotating to the stationary reference frame, feedback of unit electrical vectors in appropriate phase position is necessary. In Blaschke's or direct method of vector control, the unit vectors are obtained from rotor flux which can either be based on measurement or computation. In Hasse's or indirect method of vector control, the unit vectors are synthesized by addition of the rotor mechanical position vector and the commanded slip angle vector derived from the torque component of current. Both vector control methods require complex coordinate transformation, phase conversion, and intricate vector signal sensing and processing. In the former method, a flux coil may be considered undesirable; and the control based on computation may be difficult to implement due to harmonics, and practically impossible to implement near zero speed. Although the latter method can be implemented satisfactorily down to zero speed and is somewhat free from feedback harmonics, a precision position encoder on the machine shaft may not always be desirable. While it is desirable to control ac machines in a decoupled manner as dc machines, thereby achieving dc machine-like transient response, it is difficult in practice to eliminate coupling. For example, during current transients when the feedback current does not match the commanded current, the vector diagram on which the theory is based does not hold true, and partial coupling dictated by the d-q machine transients will exist. Again, both control methods are somewhat dependent on machine parameters, the inaccuracy and unpredictable nature of which worsen the coupling effect.

It is an object of the present invention to provide an induction motor control that achieves fast response at various operating points using a simplified control.

It is a further object of the present invention to achieve decoupling between the commanded frequency and rotor flux in a scalar control during static and dynamic conditions at all operating points.

It is a still further object of the present invention to provide a scalar decoupled control having fast transient response and four-quadrant operating capability.

SUMMARY OF THE INVENTION

In one aspect of the present invention an induction machine drive is provided which uses a scalar control supplemented by a decoupler function generator to maintain rotor flux constant during both steady state and transient conditions. The control provides a stator current command and a stator frequency command to control the variable frequency power supplied by a current-controlled inverter to the induction machine. An external machine torque command is used to generate a machine slip command. A stator current command is generated from the slip command by a first function generator which maintains rotor flux constant and generates the torque component of stator current during steady state conditions. A stator frequency command is obtained by adding a signal representative of the rotor frequency to the slip command. A second function generator is responsive to changes in the frequency command and provides a time dependent output to compensate the first stator current command to maintain the rotor flux constant during transient conditions.

BRIEF DESCRIPTION OF THE DRAWING

The features of the invention believed to be novel are set forth with particularity in the appended claims. The invention itself, both as to organization and method of operation, together with further objects and advantages thereof, may best be understood by reference to the following description taken in conjunction with the accompanying drawing in which:

DETAILED DESCRIPTION OF THE INVENTION

Figure 1A:
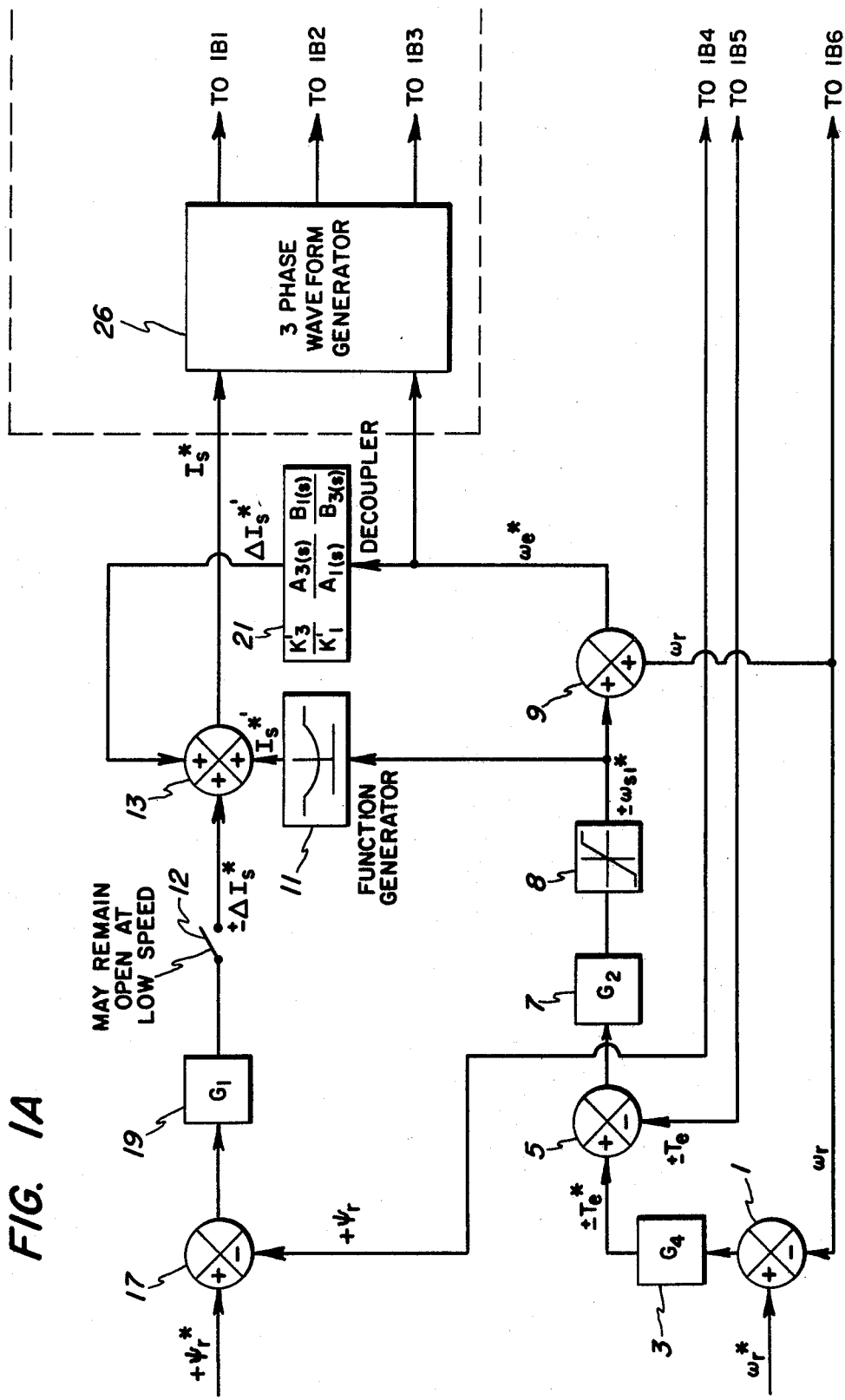
FIGS. 1A and 1B together form a part block diagram, part schematic diagram representation of a drive system including a decoupler, in accordance with the present invention.
Figure 1B:
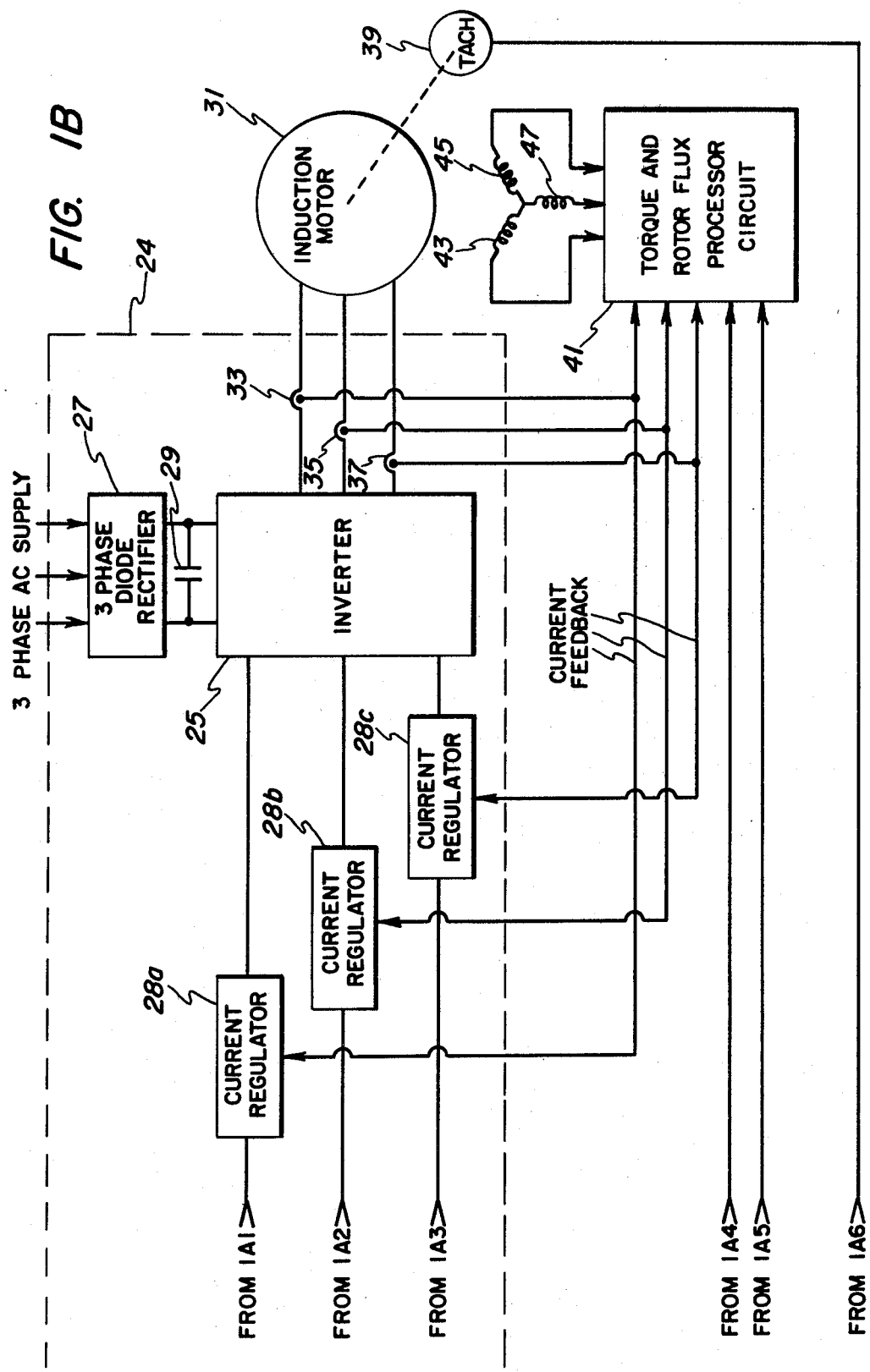

Referring now to the drawing wherein like numerals indicate like elements, there is shown in FIG. 1 a speed control loop having an electrical speed command $\omega_r^*$. The commanded electrical speed is compared to the actual electrical rotor speed $\omega_r$ in summer 1. The relationship between the electrical rotor speed $\omega_r$ and the mechanical rotor speed $\omega_n$ is $\omega_r = P/2 \, \omega_n$ where P is the number of poles, and $\omega_r$ and $\omega_n$ are measured in radians/sec. The speed error signal is passed through a proportional plus integral regulator 3 to provide a torque command $T_e^*$ which when positive indicates motoring and when negative indicates regeneration. The commanded torque is compared to the calculated torque $T_e$ in summer 5. The torque error signal produced by summer 5 is passed through a proportional plus integral regulator 7 to provide a slip command $\omega_{s1}^*$. A limiter circuit 8 limits the maximum and minimum values of the slip command. The slip command from limiter circuit 8 is added to the rotor speed $\omega_r$ in a summer 9 to obtain a stator voltage frequency command $\omega_e^*$ (measured in radians/sec.). The slip command is also provided to a function generator 11 to determine the stator current command $I_s^*$ to achieve constant rotor flux $\omega_r$ and regulate torque component of stator current. The relationship between stator currents $I_s$ and slip $\omega_{s1}$ is shown in equation (1).

$$I_s = \frac{\Psi_r}{m} \sqrt{1 + \frac{L_r^2}{R_r^2} \omega_{s1}^2} \qquad (1)$$

where $\Psi_r$ is the rotor flux;
m is the mutual inductance referred to the stator;
$L_r$ is the rotor inductance referred to the stator;
$R_r$ is the rotor resistance referred to the stator; and
$\omega_{s1}$ is the slip in radians per second.

As can be seen from equation (1) $I_s$ has two components. The first is a flux component and the other is related to slip and is the torque component. When the rotor flux is held constant the stator current is a function of the slip.

The stator current is offset at zero slip by a current equal to the magnetizing current, so that during machine operation the rotor flux can be maintained constant during transitions through zero slip.

The desired stator current $I_s^*$ is supplied to a summer 13.

To achieve decoupling of the fundamental frequency command from the rotor flux, the fundamental frequency command $\omega_e^*$ is passed through a decoupler 21 to provide a compensating signal $I_s^{*'}$. The compensating signal and the stator current command signal $I_s^{*'}$ are summed in summer 13 to provide a compensated stator current command $I_s^*$. If it is desired to achieve greater accuracy and to adjust for possible saturation effects, a feedback signal can be used to modify the error signal at summer 13 at speeds typically above 0.1 per unit of base speed by comparing the desired rotor flux $\Psi_r^*$ with the measured rotor flux $\Psi_r$ in a summer 17 and passing the resulting error signal through a proportional plus integral regulator 19 to provide the summer 13 with a stator current error signal $\Delta I_s^{*'}$.

The compensated stator current command $I_s^*$ and the stator frequency command $\omega_e^*$ are the two command signals applied to a voltage-fed current-controlled inverter 24. The current-controlled inverter 24 comprises a three phase diode rectifier 27, a dc-ac inverter 25, a three phase waveform generator 26, three current regulators 28a, 28b and 28c and three current sensors 33, 35 and 37. The three phase diode rectifier 27 is supplied from a three phase a.c. supply (not shown). The d.c. output of the three phase diode rectifier is supplied to the inverter and a capacitro 29 is connected across the input terminals of the voltage-fed inverter 25. The compensated stator current command $I_s^*$ and the stator voltage frequency command $\omega_e^*$ are supplied to the three phase waveform generator 26 and determine the three phase waveform magnitude and frequency, respectively. The three phase waveform generator produces three waveforms 120° phase shifted relative to one another. Each of the three phase waveforms can be sinusoidal, for example. One phase of the waveform is supplied to each of the current regulators 28a, 28b and 28c. The current regulators also receive a feedback signal proportional to each of the three phase motor stator currents from current sensors 33, 35 and 37. The current regulators 28a, 28b and 28c compare the waveform generator signals to the actual signal to shape the motor stator current, causing the motor stator current to follow the waveform generator signals within a predefined tolerance band. The inverter 25 supplies the three phase current-controlled pulses to a three phase induction machine 31. The induction machine 31, shown as a motor, includes flux sensing coils 43, 45 and 47 inserted in the motor. A tachometer 39 is driven by the rotor of machine 31. A torque and rotor flux processor circuit 41 receives input signals of the three phase current supplied to the machine from sensors 43, 45 and 47 and air gap voltages from sensing coils 43, 45 and 47. The air gap voltages are integrated in processor circuit 41 to obtain the air gap fluxes.

Processor circuit 41 compensates the air gap flux with the machine rotor leakage reactance to produce a signal representative of rotor flux. The air gap voltages and machine currents are also used by processor circuit 41 to measure machine torque. A circuit for generating signals representative of rotor flux and torque from machine currents and air gap voltages and which may be employed as a component of processor circuit 41, is shown in U.S. Pat. No. 4,258,302 and assigned to the same assignee as the present invention. U.S. Pat. No. 4,258,302 is hereby incorporated by reference. If flux coils are not available, rotor flux can be calculated from stator voltages and currents.

Figure 2:
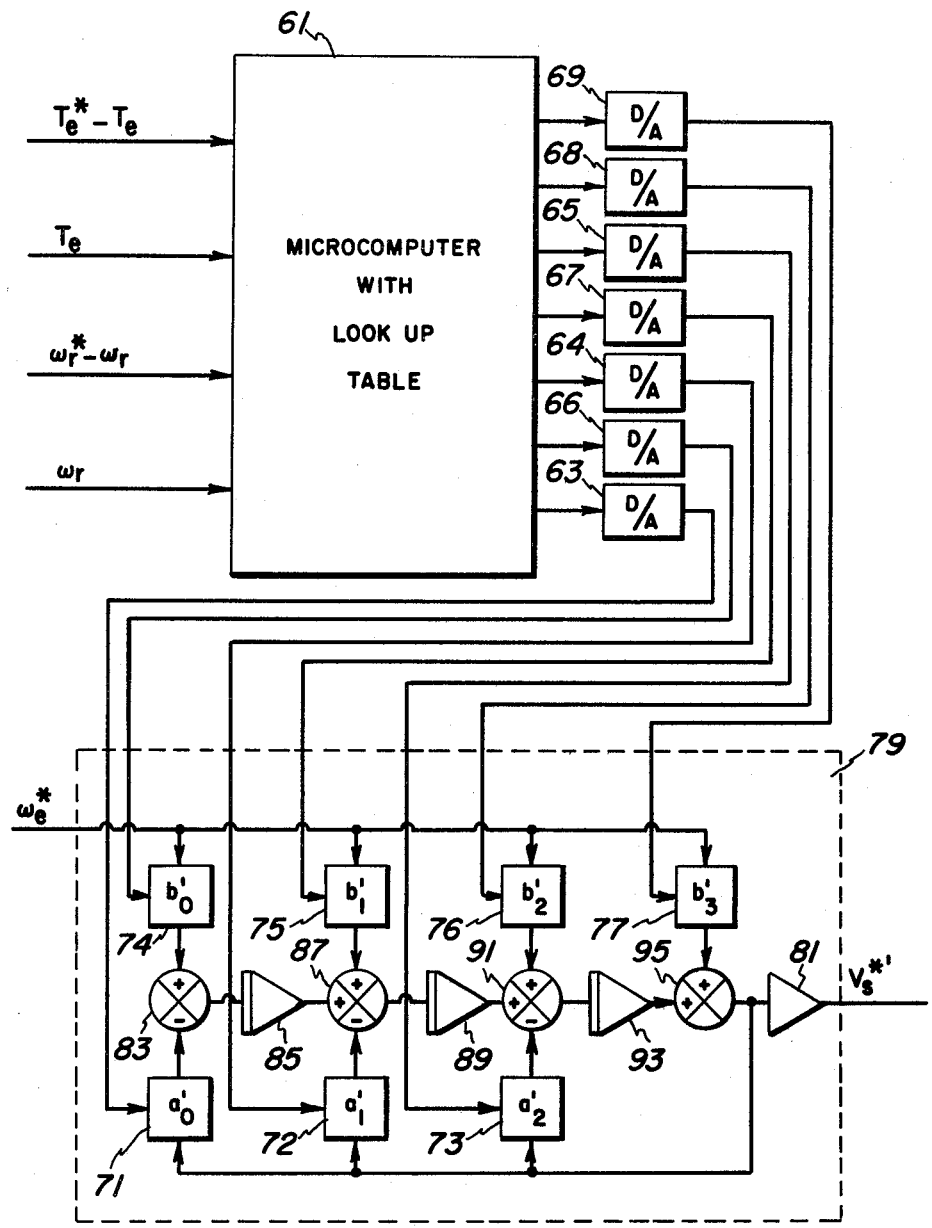
FIG. 2 is a block diagram representation of the decoupler of FIG. 1 combined with a look-up table controller to supply appropriate coefficients to the decoupler.

An implementation of the decoupler circuit 21 is shown in more detail in FIG. 2. A microcomputer with look-up table 61 receives as an input a signal corresponding to the difference between the commanded and actual torque $T_e^* - T_e$, the difference between the commanded rotor frequency and the actual rotor frequency $\omega_r^* - \omega_r$, the actual torque $T_e$ and the rotor frequency $\omega_r$. The torque command $T_e^*$ is developed from a speed control error in regulator circuit 3 (shown in FIG. 1), the rotor speed is available from tachometer 39 (shown in FIG. 1) and the commanded rotor frequency can be obtained by subtracting commanded slip $\omega_{s1}^*$ from the commanded stator frequency $\omega_e^*$. The microcomputer has seven parallel outputs connected to seven digital-to-analog converters (DACs) 63–69. The DACs 63–69, are connected to multipliers 71–77, respectively, to adjust the coefficients $a_0'$, $a_1'$, $a_2'$, $b_0'$, $b_1'$, $b_2'$ and $b_3'$ according to the look-up table output.

The commanded stator frequency $\omega_e^*$ is an input signal to the analog decoupler circuit 79 and is connected to each of the multipliers 74–77. A summer 83 receives the output signal of multiplier 74, which is the product of the coefficient loaded into the multiplier by the microcomputer and the signal $\omega_e^*$, at a non-inverting input, and receives the output signal of multiplier 71 at an inverting input. The output of the summer 83 is connected to an analog integrator 85. A summer 87 receives at its non-inverting inputs the output signal from integrator 85 and multiplier 75 and at its inverting input the output of multiplier 72. The output of summer 87 is connected to an analog integrator 89. A summer 91 receives at its non-inverting inputs the output signal from multiplier 76 and integrator 87, respectively, and at its inverting input the output signal of multiplier 73. The output of summmer 91 is connected to an integrator 93. A summer 95 sums the output signals from integrator 93 and multiplier 77. The output of summer 95 is connected to an operational amplifier 81 for adjusting the scale and the polarity of the output signal. The output of the summer 95 is also connected to multipliers 71, 72 and 73. The output of amplifier 81 is the stator current command $I_s^*$ which is supplied to the inverter 24.

Figure 3:
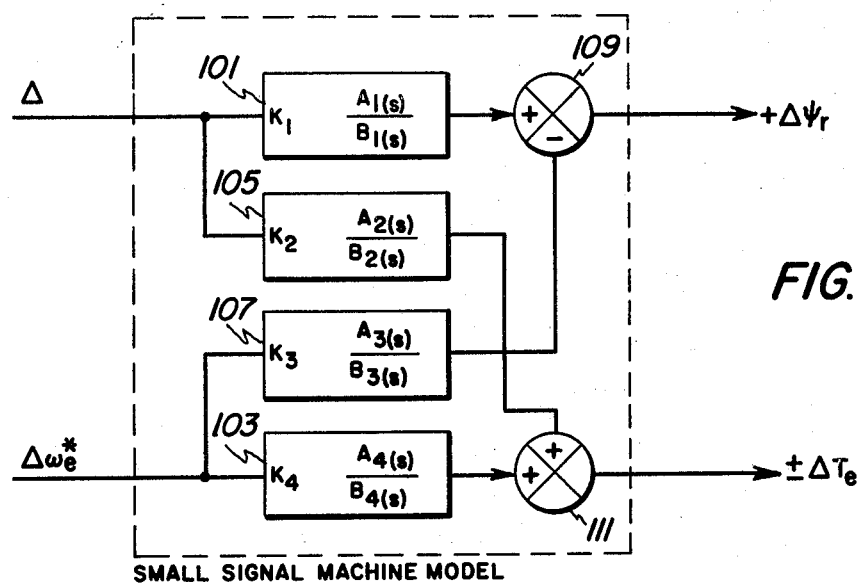
FIG. 3 is a block diagram representation of a small signal model of an induction motor.

The induction machine 31 shown in FIG. 1 can be modeled as a multivariable nonlinear coupled system where each of the outputs, rotor flux and machine torque, can be shown to be a function of the control variables stator voltage and frequency. The dynamics of the inverter and pulse width modulation (pwm) control are neglected in the model. At any steady state operating point, the system can be linearized by a small signal perturbation method to arrive at the machine transfer functions as shown in FIG. 3. The transfer function $$K_1 \frac{A_1(s)}{B_1(s)}$$

in block 101 represents the contribution made by a change in stator voltage to the rotor flux. The transfer function $$\frac{K_4 A_4(s)}{B_4(s)}$$

in block 103 represents the contribution made by a change in commanded frequency to the machine torque. The transfer function $$K_2 \frac{A_2(s)}{B_2(s)}$$

of block 105 represents the contribution made by a change of stator voltage to the machine torque. The transfer function $$K_3 \frac{A_3(s)}{B_5(s)}$$

of block 107 represents the reduction of rotor flux resulting from a positive increase of command frequency. A summer 109 subtracts the contribution from block 107 from the contribution of block 101 to arrive at the rotor flux. A summer 111 adds the contribution from block 103 to the contribution of block 105 to arrive at the machine torque.

To explain how the model shown in FIG. 3 works, we will look at what happens when the commanded frequency $\omega_e^*$ is incrementally increased, which can happen as a result of increase in the torque command. The rotor flux is reduced by the transfer function $K_3 A_3(s)/B_3(s)$. Since the torque is being regulated by the slip control for a fixed rotor flux, the effect of $K_3 A_3(s)/B(s)$ has to be eliminated under all operating conditions to achieve a rapid response to changes by the torque command. To accomplish this, a decoupler transfer function shown in equation (2)

$$F(s) = K_3 \frac{A_3(s)}{B_3(s)} \times \frac{1}{K_1} \frac{B_1(s)}{A_1(s)} = \frac{K_3}{K_1} \frac{A_3(s) B_1(s)}{A_1(s) B_3(s)} \quad (2)$$

is implemented in decoupler circuit 21 shown in FIG. 1, with the gains $K_3$ and $K_1$ appropriately scaled to $K_3'$ and $K_1'$. To achieve rapid response to changes in torque command the rotor flux must be held constant during transient conditions. Compensating the current command for changes due to the frequency command decouples the frequency command from the rotor flux. If the machine model were linear, the decoupler parameters would always remain constant at different operating points. For a non-linear model as we have here, however, the machine transfer function parameters will vary at each operating point and therefore the decoupler has to be adaptive to compensate for these variations. To avoid computational rigor which causes real time delay in implementing the decoupler, as look-up table can be used to store precalculated results as will be described in further detail hereinbelow. The transfer function in equation (2) is a ratio of polynomials of the Laplace operator s From the state equations of the system with given parameters, the steady state operating conditions are solved at different steady state operating points, the system is linearized by small signal perturbation and the poles and zeroes and gain are solved for the specified input and output variables, namely torque, flux and rotor frequency. The Laplace transform of the linearized system at a particular operating point can be approximated as a third order system shown in equation (3)

$$F(s) = C \frac{1 + D_1 s + D_2 s^2 + D_3 s^3}{1 + E_1 s + E_2 s^2 + E_3 s^3} \quad (3)$$

where C, $D_1$, $D_2$, $D_3$, $E_1$, $E_2$ and $E_3$ are constants and s is the Laplace operator Taking the inverse Laplace transform, equation (3) can be written in the form of a linear differential equation shown in expression (4)

$$\dddot{y} + a_2 \ddot{y} + a_1 \dot{y} + a_0 y = b_0 x + b_1 \dot{x} + b_2 \ddot{x} + b_3 \dddot{x} \quad (4)$$

where
  $\dddot{y}$ is the third derivative with respect to time,
  $\ddot{y}$ is the second derivative with respect to time,
  $\dot{y}$ is the first derivative with respect to time: and
  $a_0$, $a_1$, $a_2$, $b_0$, $b_1$, $b_2$ and $b_3$ are constant coefficients.

Figure 4:
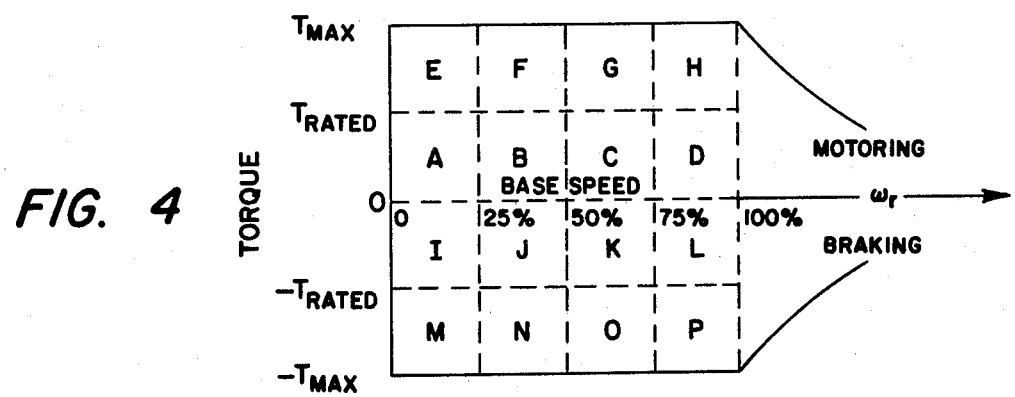
FIG. 4 is a graph showing the steady state operating cells in the $T - \omega_r$ of the look-up table employed in the apparatus of FIG. 2.

When the decoupler parameters are solved at different electrical steady state operating points in the torque and rotor speed plane, (rotor flux being kept constant) the resulting coefficients in the differential equations, after appropriate scaling to be usable in an analog circuit, are stored as shown in the look-up table in FIG. 4. The look-up table, which is part of a microcomputer, can be divided into different cells shown lettered A-P. The torque, rotor flux and the rotor speed define the operating point parameters (rotor flux is held constant at all operating conditions). Operating points from zero to base speed and from zero to maximum motoring and generating torque are shown.

The coefficients stored in cell A correspond to operating points from zero to rated torque and from zero to 25% base speed. Therefore when the operating conditions fall anywhere within the cell the coefficients corresponding to cell A will be addressed. The appropriate coefficients are set by determining the operating point in the torque and rotor frequency plane during steady state conditions and setting the appropriately scaled coefficients $a_0'$, $a_1'$, $a_2'$, $b_0'$, $b_1'$, $b_2'$, and $b_3'$ in the analog computer shown in FIG. 2. As evident in FIG. 2, there are seven coefficients and therefore seven output lines from the look-up table memory as shown in FIG. 4. The coefficients are changed from digital to analog signals in digitial to analog converters (DACs) to set the coefficients in the analog circuit 79 shown in FIG. 2.

The operation of the controller shown in FIG. 1 will now be described. A speed command $\omega_r^*$ is supplied to a speed control loop comprising elements 1, 3 and 39 which generates a torque command for the torque control loop. The torque is controlled by the slip command $\omega_{sl}^*$ which is obtained from the outer torque control loop comprising elements 5, 7, 8 and 41. The difference between the commanded torque obtained from the speed control loop and the actual torque from the torque processor circuit 41 is applied to a proportional plus integral regulator 7 to generate the slip. The rotor speed from the tachometer 39 is added to the slip to obtain the voltage frequency command $\omega_e^*$ for the inverter. A stator current command $I_s^{*'}$ is generated from the slip command by the function generator 11 to provide the desired constant rotor flux and generate the torque component of stator current during steady state conditions. The input signal provided to the decoupler 21 is the commanded frequency.

The flux control loop may remain open throughout the entire speed range of the motor, but it is desirable to close the loop through a switch 12, typically when operating above 10% of the base speed, for precision control of machine rotor flux. The inverter commands of current magnitude $I_s^*$ and frequency $\omega_e^*$ are scalar analog signals which can be supplied either to a microprocessor current controlled pwm (bang-bang) control to generate current-controlled inverter switching waves or processed through dedicated hardware as in the present invention.

Figure 5:
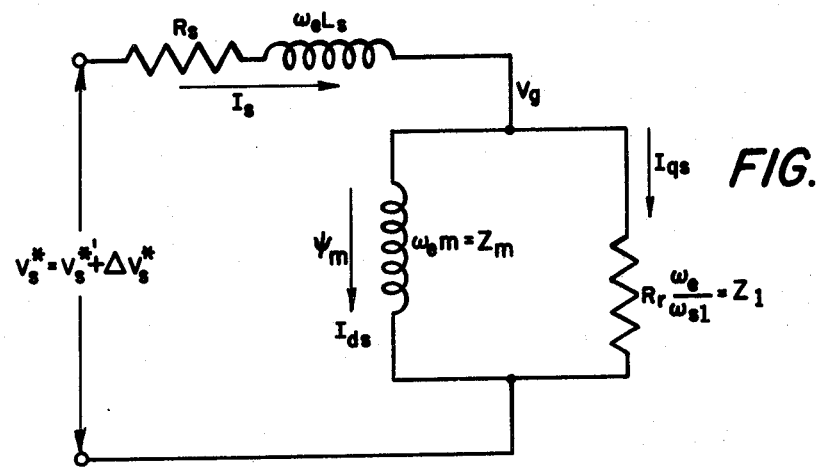
FIG. 5, shows a per phase steady state equivalent circuit of an induction motor with rotor leakage inductance helpful in explaining the operation of FIG. 1.

The transient and steady state operation of the decoupler 21 will now be qualitatively explained with the help of FIG. 5 which shows the simplified per phase equivalent circuit neglecting the rotor leakage inductance, hence the magnetizing flux $\Psi_m$ is equal to the rotor flux $\Psi_r$. $I_{ds}$ is the magnetizing or flux component of current and $I_{qs}$ is the torque component of the current. The stator resistance $R_s$ and the stator reactance $\Psi_e L_s$ are shown in series with one another and the parallel combination of the magnetizing inductance $Z_m$ referred to the stator and the rotor impedance $Z_1$ referred to the stator. Assuming slip remains constant but speed, $\omega_e$ gradually increases, the impedances $Z_m$ and $Z_1$ will increase proportional to frequency, tending to decrease the current, but the feedback loop which includes the function generator 11 will regulate the current so that the stator current $I_s$ will increase with frequency. The symmetrical increase of impedances $Z_m$ and $Z_1$ in FIG. 5 for (slip remains unchanged) fixed value of stator current $I_s$ does not result in changes in the rotor flux $\omega_r$. Therefore, the steady-state output of the decoupler 21 of FIG. 1 will be nearly zero. If a transient increase of the stator frequency command $\omega_e^*$ occurs due to an increase of $\omega_{sl}^*$, the stator flux $\omega_r$ will tend to diminish. The decoupler will transiently boost $\Delta I_s^{*'}$ to compensate for the reduction of rotor flux $\omega_r$. Meanwhile, the higher current command $I_s^{*'}$ from the function generator 11 of FIG. 1, will tend to restore the steady-state condition.

When the steady-state condition of the machine is reached as determined by the difference between commanded and actual torque and commanded and actual frequency being less than predetermined values, the coefficients stored in the cell in the memory corresponding to the constant values of torque and electrical speed are set in the analog circuit multipliers of FIG. 2 which implements the transfer function. The purpose of the decoupler, which is implemented by the analog circuit, is to compensate for the coupling between the frequency and rotor flux to keep the rotor flux constant during transient conditions and therefore provide a rapid response. When a new steady-state condition is achieved, the coefficients in the lookup table corresponding to the present steady state torque and constant frequency values will be set in the analog computer multipliers. During the steady state conditions, the decoupler provides a gain which, together with the stator current feedback loop, provides the constant flux level. During transient conditions the decoupler provides more than a gain; specifically, the decoupler provides a response that is dependent on the variation, with respect to time, of the input parameter (frequency) to counteract the interaction between frequency and rotor flux taking place in the induction machine so that constant rotor flux can be maintained. With constant rotor flux maintained during transient conditions, transient response to torque commands will be quick. The coupling between changes in commanded current and torques serves to increase the amount of torque response.

Assuming the machine is at zero speed and within rated torque, the coefficients associated with cell A are set in the multiplier, and a torque command for maximum torque then occurs. The machine will accelerate and when maximum torque is achieved at a constant machine speed (assuming a constant load), the coefficient corresponding to the operating point in the torque speed plane will be loaded in the multipliers. The coefficients in any one cell can be used for a transient response to any other cell during transient motoring or regenerating. The compensation of the decoupler will be most accurate when the least number of cells are traversed during transient conditions.

The foregoing describes a scalar decoupled control for an induction machine that achieves fast response by decoupling the commanded frequency from the rotor flux during static and dynamic conditions at all operating points.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. An induction machine drive for achieving fast transient response, said drive being coupled to an induction machine and comprising:

a voltage fed current controlled inverter providing variable frequency a.c. power to the induction machine;

torque sensing means coupled to said machine for generating a signal indicative of actual machine torque;

first comparison means coupled to said torque sensing means for comparing a commanded torque signal to said signal indicative of actual machine torque to generate a commanded torque error;

slip command generating means for generating a slip command from the commanded torque error;

a first function generator coupled to said slip generating means and being responsive to commanded slip for providing a stator current magnitude command to maintain rotor flux constant during steady state condition at a predetermined value dependent on a predetermined relationship between slip and stator current, said stator current magnitude command providing a torque producing component for said machine;

signal generating means responsive to rotor speed of said machine for generating a signal indicative of actual rotor speed;

first summation means coupling said slip command generating means and signal generating means to said inverter, said first summation means adding said slip command to said actual rotor speed to generate a stator frequency command for said inverter;

a second function generator coupled to said summation means and being responsive to changes in commanded stator frequency for generating a decoupling signal; and second summation means adding said first and second function generator signals and coupling the resultant signal to said inverter, said second function generator signal compensating said stator current command signal from said first function generator to maintain rotor flux constant at said predetermined value during transient conditions due to changes in the commanded machine stator frequency.

2. The induction machine drive of claim 1 wherein said second function generator comprises means for implementing a transfer function having changeable coefficients, means for determining when said machine is operating in steady state, and means for changing said coefficients of said transfer function implementation when said machine has been determined to be operating in steady state conditions to values dependent upon the present operating point of the machine.

3. The induction machine of claim 2 wherein said second function generator further comprises means for storing said coefficients for use in said transfer function implementation dependent on operating conditions.

4. The induction machine of claim 3 wherein said means for determinig when said machine is operating in steady state comprises means for determining when the difference between commanded and actual torque is less than a predetermined limit and when the difference between the commanded frequency and the actual frequency is below a predetermined limit at the same time.

5. The induction machine drive of claim 4 wherein the present operating point of the machine during steady state used with said second function generator is determined by the actual measured torque and actual measured speed of the machine.

6. The induction machine drive of claim 1 further comprising second comparison means coupled to said signal generating means for comparing said signal indicative of actual rotor speed to a commanded speed signal, and regulator means coupled to said third comparison means and providing as an output signal said commanded torque signal.

7. The induction machine drive of claim 1 further comprising means for measuring rotor flux, means for generating a command proportional to the desired constant rotor flux, means for comparing the commanded to the actual rotor flux to develop an error signal, and regulator means for adjuting said error signal to provide a stator current command adjustment, said stator current command adjustment summed together with said first and second function generator signals in said second summation means.

* * * * *